Jan. 22, 1924.
R. W. CROSSMAN ET AL
REPLANTER
Filed Sept. 7, 1921
1,481,457
2 Sheets-Sheet 1
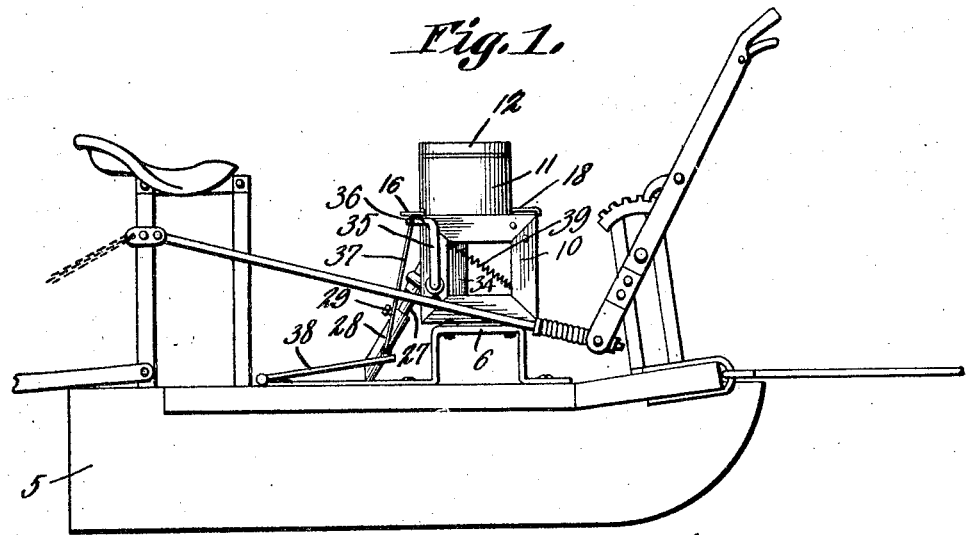
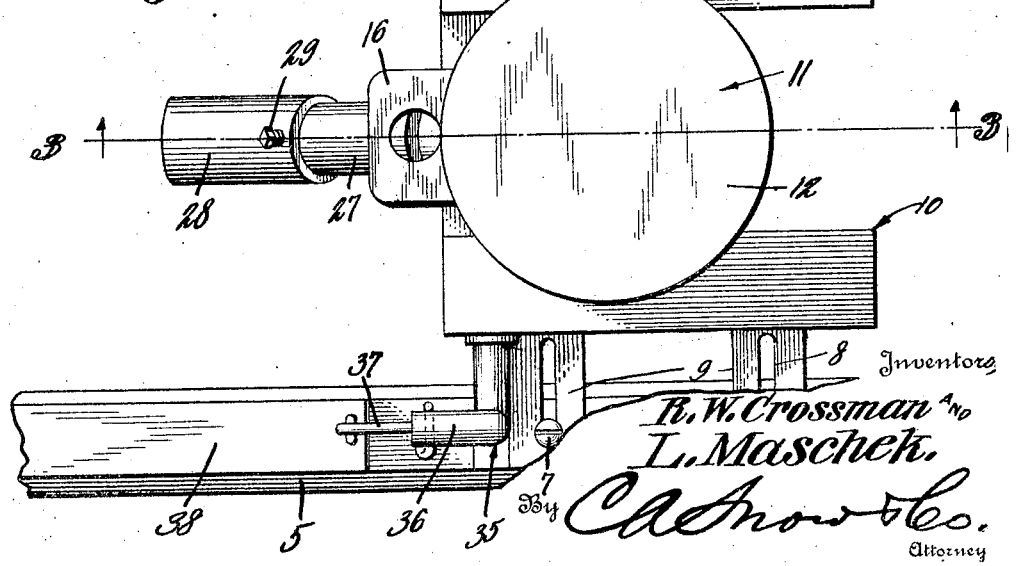

Jan. 22, 1924.

R. W. CROSSMAN ET AL 1,481,457

REPLANTER

Filed Sept. 7, 1921   2 Sheets-Sheet 2

Inventors
R. W. Crossman and
L. Maschek.
By C. A. Snow & Co.
Attorney

Patented Jan. 22, 1924.

1,481,457

UNITED STATES PATENT OFFICE.

ROBERT W. CROSSMAN AND LOUIS MASCHEK, OF TEXOLA, OKLAHOMA, ASSIGNORS, BY DIRECT AND MESNE ASSIGNMENTS, TO VISIBLE MANUFACTURING CO., OF TEXOLA, OKLAHOMA.

REPLANTER.

Application filed September 7, 1921. Serial No. 498,987.

*To all whom it may concern:*

Be it known that we, ROBERT W. CROSSMAN and LOUIS MASCHEK, citizens of the United States, residing at Texola, in the county of Beckham, State of Oklahoma, have invented a new and useful Replanter, of which the following is a specification.

This invention relates to seeders and planters, and more particularly to a seeder or planter especially designed for replanting rows wherein the machine used in planting the field has failed to drop seed.

The primary object of the invention is to provide a machine of this character which may be controlled by a foot pedal actuated by the operator, the foot pedal operating to drop seed at predetermined intervals.

A further object of the invention is to provide a novel means for loosening the soil simultaneously with the dropping of the seed to insure the planting.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a replanter constructed in accordance with the present invention.

Figure 2 is a fragmental plan view of the same.

Figure 3:
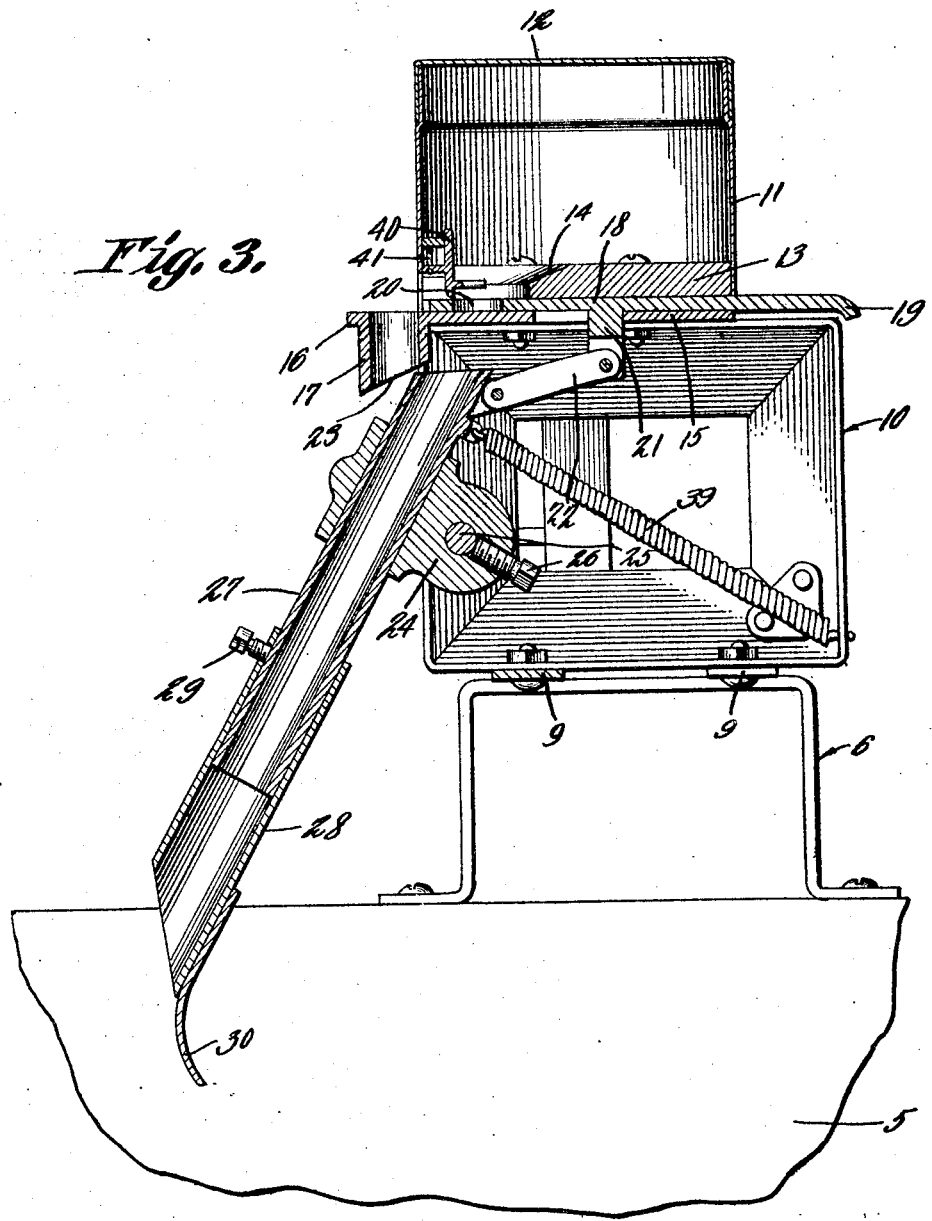
Figure 3 is a sectional view taken on line 3—3 of Figure 2.

Referring to the drawings in detail, the support for the replanter comprises a pair or runners 5 to which are secured the bracket members 6, the bracket members being of constructions to extend above the upper surfaces of the runners 5.

Carried by the bracket members 6 are the screws 7 which are disposed within the elongated openings 8 formed in the lateral arms 9, by means of which the frame 10 of the planter may be supported. Positioned on the frame 10 is the grain box 11 which is provided with a removable cover 12 and a stationary bottom 13, which bottom is provided with an opening adjacent to one edge thereof, the walls of the opening being inclined as at 14 to direct seed through the opening.

Disposed in spaced relation with the stationary bottom 13 is an auxiliary bottom 15 that has one portion thereof extending beyond the side wall of the grain box 11 as at 16, where the same is provided with a depending discharge spout 17 that has its lower end inclined as at 23. Operating within the space between the auxiliary bottom 15 and stationary bottom 13 is a movable slide 18 which has its forward end extending downwardly as at 19 to contact with one edge of the auxiliary bottom 15 to restrict movement of the slide with respect thereto.

An opening 20 is formed in the slide 18 which opening is adapted to move under the discharge opening of the stationary bottom 13 to receive seed therefrom, where the seed is carried over the tube 17 of the auxiliary bottom 15 to discharge the same. Formed integral with the lower surface of the slide 18 is an arm 21, which carries a link 22 that has connection with the pipe 27 which in turn is secured to the transversely extending shaft 25, as by means of the set screw 26.

The discharge pipe 27 has its upper extremity inclined so that the same will closely engage under the discharge tube 17, when the same has been moved into registry therewith. Carried at the lower end of the discharge pipe 27 is an adjustable pipe 28, the same being held in various positions of adjustment along the pipe 27 as by means of the set screw 29. Secured to the lower forward surface of the pipe 28, is a blade 30 which is curved forwardly to dig into the surface over which the replanter is moved to form an opening for the reception of a seed.

This shaft 25 has its ends disposed beyond the side walls of the frame 10, there being provided a head 31 on one end of the shaft, which head provides a support for the forwardly extending arm 32 that moves between the arms 33 of the bracket 34 so that movement of the shaft 25 in either direction is restricted.

On the opposite end of the shaft 25, is an arm 35 that has a right angled end 36 which has pivotal connection with the rod 37.

This rod 37 has its lower end connected with the pedal 38 which is operated by the foot of the operator, so that movement of the pedal will result in a sliding movement of the slide 18 to carry a seed to the opening 17. Connected to the pipe 27 is a coiled spring 39, the opposite end of the coiled spring being anchored to the frame 10 to return the slide 18 to its normal position as shown by Figure 1 of the drawings.

In order that the grain passing from the grain box 11 will not clog the opening, and prevent movement of the slide 18, a guard 40 is provided, the guard being constructed to move vertically should a seed be wedged thereunder, it being understood however that the guard 40 normally acts to remove the surplus seed from the slide 28. A spring 41 operates to move the guard 40 vertically, and return the same to its normal position.

From the foregoing it will be seen that by an operation of the pedal 38, the discharge pipe 27 is moved to a position under the tube 17, the lower portion of the discharge pipe digging an opening to receive a seed which falls through the discharge tube 27.

It might be further stated that in the use of the replanter, it is contemplated to hitch the device to a cultivator, in any suitable and well known manner.

Having thus described the invention, what is claimed as new is:—

A planter including runners, a grain box supported above the runners and having an outlet opening, an auxiliary bottom spaced from the bottom of the grain box, a slide having an opening adapted to register with the opening of the grain box, said auxiliary bottom having one end thereof extending beyond the wall of the grain box, and supplied with a discharge spout, said discharge spout having an inclined lower edge, a pivoted discharge pipe having an inclined upper edge cooperating with the inclined lower edge of the first mentioned discharge spout, means for connecting the slide and second mentioned discharge spout whereby movement of the discharge spout results in a relative movement of the slide to cause the slide to pick up seed and deposit the same in the discharge spouts, and means for moving the last mentioned discharge spout.

In testimony that we claim the foregoing as our own, we have hereto affixed our signatures in the presence of two witnesses.

ROBERT W. CROSSMAN.
LOUIS MASCHEK.

Witnesses:
 IRA SPEED,
 H. A. BILLS.